May 23, 1944.　　　　W. WORTH　　　　2,349,327
VISCOSITY CONTROL VALVE
Filed July 1, 1936　　　3 Sheets-Sheet 1
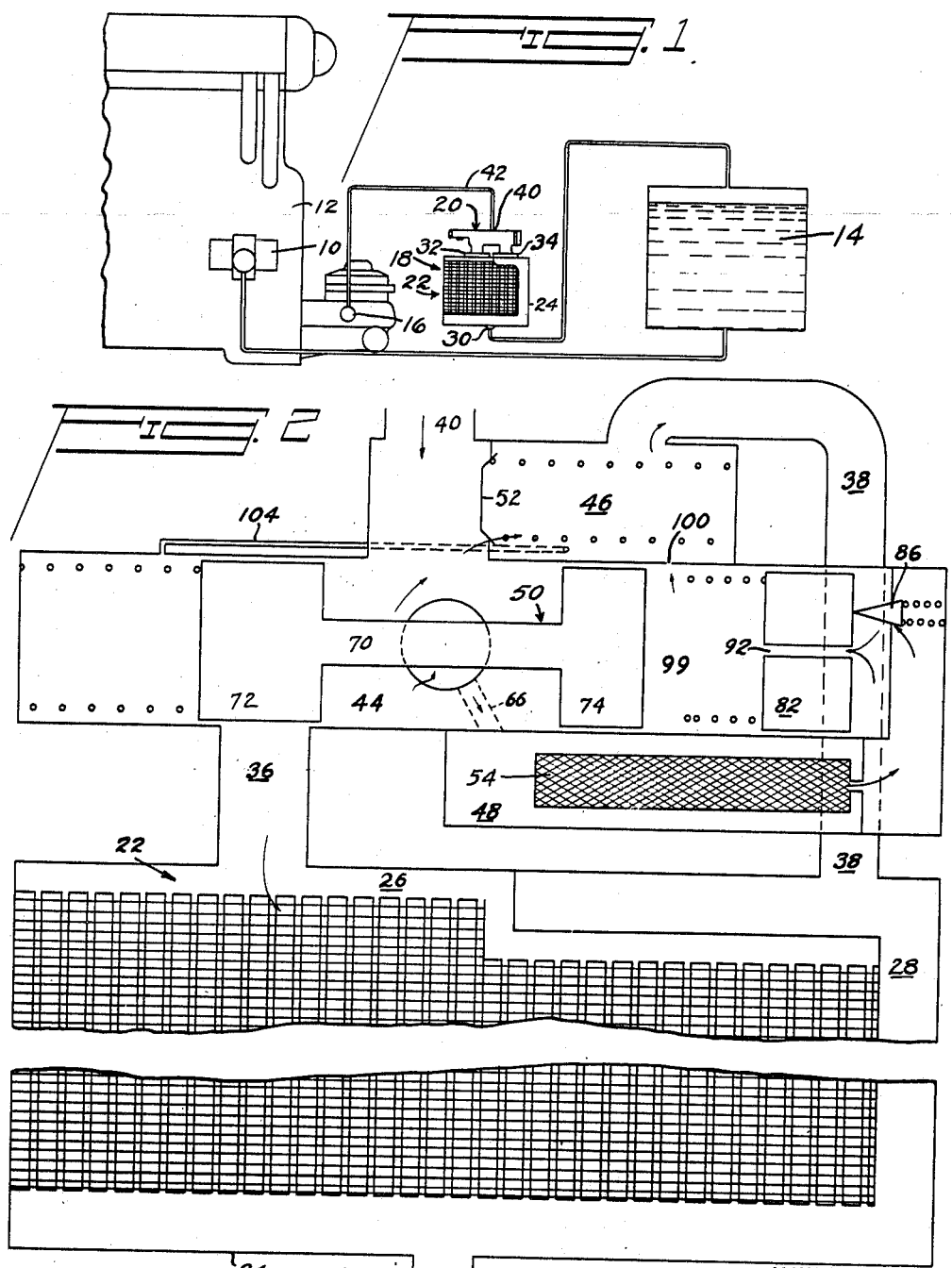
INVENTOR
WELDON WORTH
BY
ATTORNEYS May 23, 1944.        W. WORTH        2,349,327
VISCOSITY CONTROL VALVE
Filed July 1, 1936          3 Sheets-Sheet 2
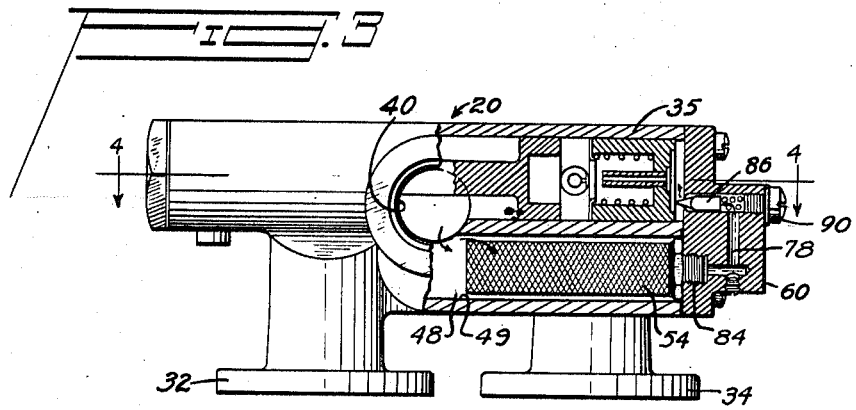
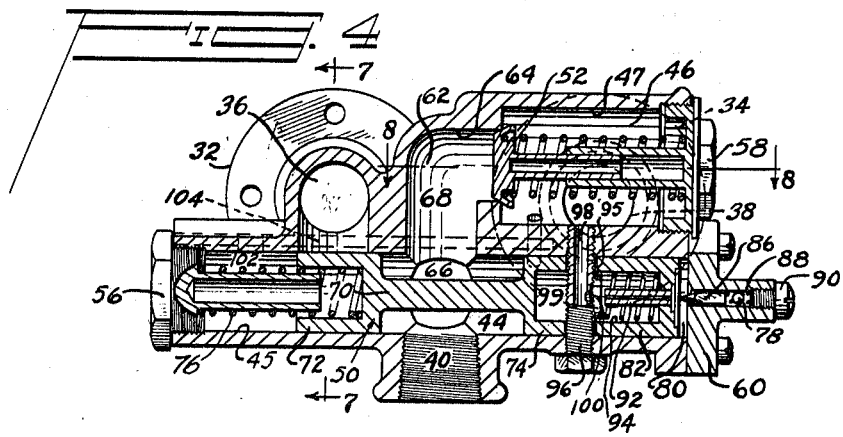
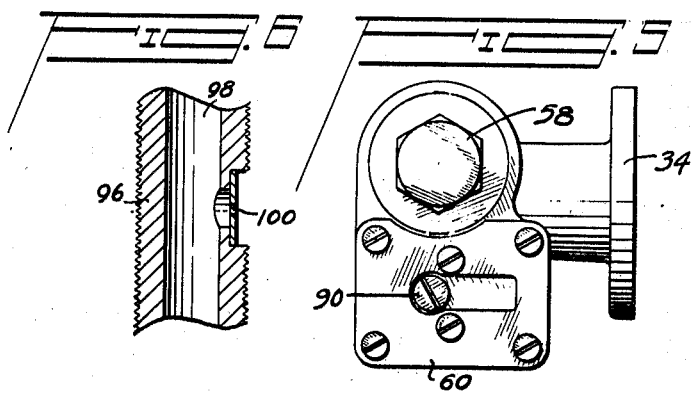
INVENTOR
WELDON WORTH
BY
ATTORNEYS

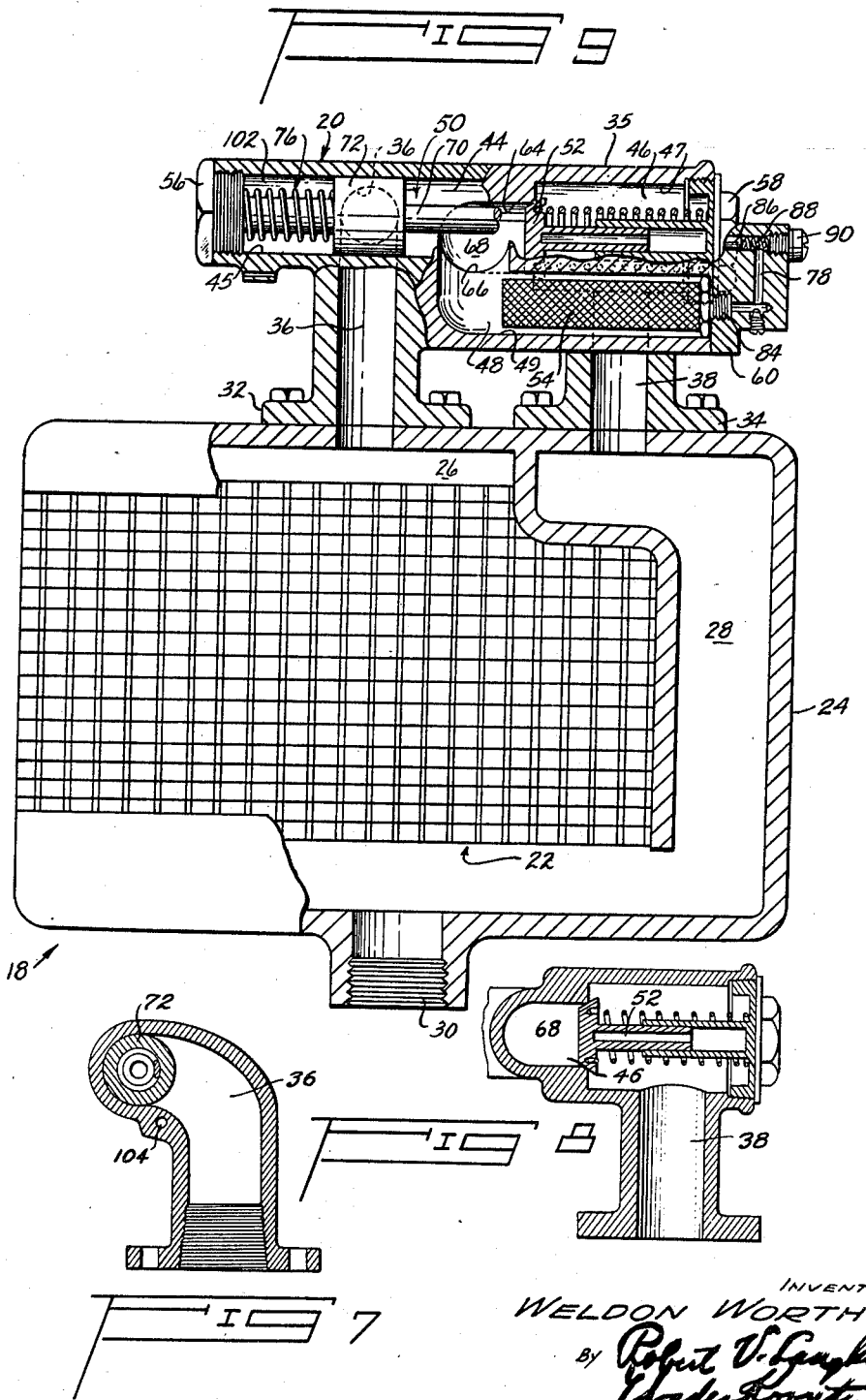

Patented May 23, 1944

2,349,327

UNITED STATES PATENT OFFICE 2,349,327

VISCOSITY CONTROL VALVE

Weldon Worth, Dayton, Ohio

Application July 1, 1936, Serial No. 88,413

19 Claims. (Cl. 184—104)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to viscosity control systems and devices and methods of controlling the viscosity of fluids in a fluid circuit.

The lubrication of an aircraft engine, or any internal combustion engine, depends upon the viscosity of the oil rather than upon the temperature or grade of oil, i. e., heavy or light. Thus, the problem of supplying the oil to the engine in the proper state with respect to viscosity is a problem of viscosity control. It is therefore evident that a solution of viscosity control in this instance would have application in any other viscosity control problem.

There has been a viscosity control valve developed for use in automobile engines but this valve operates off of the high pressure engine oil, and must therefore be mounted in the engine itself if it is to be practical.

In airplane engines and also in other internal combustion engines, this problem of viscosity control has been considered largely from a temperature angle and there has been some use of automatic thermostatic controls and manual controls, but there has been no viscosity control for airplane engines except for the very limited and unsatisfactory viscosity control that is partially obtained with the relief valve which by-passes the cooler when the oil becomes cold enough, or the flow becomes high enough to build up a pressure that is in excess of the relief valve pressure.

In such a cooler circuit the pressure drop in the circuit varies from a maximum as determined by the relief valve to a minimum as determined by the resistance to flow of the oil through the restriction of the cooler when the oil is at its maximum high temperature. At the maximum high temperature the pressure drop is found to be so small that the utilization of a viscosity control valve operating on the principle of utilizing two restrictions of different flow characteristics to determine the viscosity of the liquid flowing is impossible unless provision is made for building up the pressure drop to such an extent as will produce an operating pressure differential in the viscosity valve circuit.

My invention, therefore, has for one of its objects to provide a novel method of regulating the viscosity of a fluid in a fluid circuit in which the supply pressure is at all times sufficient to maintain circulation of the fluid in the circuit but in which the pressure drop is subject to variation, by controlling the pressure drop in the circuit in such a manner as to provide a pressure differential of sufficient value to operate a control as a function of the existent viscosity of the fluid.

Another object of this invention is to provide a fluid circuit system in which a plurality of fluid conducting branches are arranged in parallel and associated in such a manner that the pressure drop in the system is limited to a maximum value and constantly maintained at such values that fluid is forced through one of said circuits to obtain an operating viscosity responsive pressure differential.

A further object of my invention is to provide a viscosity control valve that is adaptable for use in controlling the fluid viscosity in a fluid circuit by utilizing the pressure drop across a transmission line of said circuit.

A still further object of my invention is to provide a unitary viscosity control valve that is adaptable for use in connection with an oil cooler to regulate the oil to an approximately constant viscosity regardless of the rate of oil flow, temperature, grade of oil, or amount of gasoline dilution.

Another object of my invention is to provide a viscosity control valve that is practicable and reliable and that can be mounted or constitute a part of the oil cooler without additional plumbing and without substantially adding to the maximum pressure in the oil cooler circuit.

Other and further objects of my invention will appear from a more detailed description of the invention taken in connection with drawings which form a part of this specification.

Referring to the drawings:

Fig. 1 is a diagrammatic view showing an oil circulating system embodying my invention.

Fig. 2 is a diagrammatic view showing my invention as applied to and forming a part of the oil cooler circuit.

Fig. 3 is a side elevational view of a viscosity control device, with parts in section, embodying my invention.

Fig. 4 is a sectional view taken on the line 4—4 of Fig. 3.

Fig. 5 is an end view looking from right to left in Fig. 3.

Fig. 6 is an enlarged fragmentary view of an orifice screw forming a part of this invention.

Fig. 7 is a sectional view taken on the line 7—7 of Fig. 4.

Fig. 8 is a sectional view taken along the line 8—8 of Fig. 4; and

Fig. 9 is a sectional view showing details of the diagrammatic arrangement of Fig. 2.

I have illustrated my invention in connection with an internal combustion engine which is provided with an oil circulating system including an oil cooler circuit.

The oil circulating system shown by way of illustration in Fig. 1 comprises an oil pump 10 connected between an engine 12 and a source of supply 14 for supplying oil from the source of supply to the engine under pressure; a pump 16 for withdrawing scavenged oil from the engine and returning the same to the source of supply, and an oil cooler device 18 having a plurality of branches or paths through which the oil is passed prior to its return to the source of supply, the ratio of oil passing through each branch depending upon the viscosity thereof.

The oil cooler device 18 comprises a viscosity valve 20 and an oil cooler or radiator 22.

The radiator, as illustrated in Figs. 1, 2 and 9, is of well-known construction and per se does not constitute a part of my invention. The radiator essentially consists of a casing 24 enclosing a core 26 which constitutes a restricted passage for the flow of oil and a duct 28 which constitutes an unrestricted passage for the flow of oil. These passages have a common outlet 30 and are connected by means of the viscosity regulating valve 20 in such a manner that under different operating conditions the oil entering the regulator valve will by-pass one or the other of said passages.

The viscosity regulating valve, as best shown in Figs. 3 to 9, is preferably constructed as a unitary structure that is readily detachable connected to the upper end of the oil cooler 22 by suitable means such as screws passing through flanges 32 and 34 formed integral with the valve casing 35 and around the exhaust outlets 36 and 38 (Fig. 9) that register with the restricted and unrestricted passages 26 and 28, respectively. The regulator casing is also provided with an inlet port 40 that registers with the transmission pipe 42 (Fig. 1).

The valve casing is provided with three chambers 44, 46, and 48 (Fig. 9) for respectively housing a viscosity valve device 50, a spring-loaded pressure relief valve 52, and an oil filter device 54. The chamber 44 is formed by a bore 45 that extends through the casing, one end of the bore being threaded to receive a cap screw 56, the other end being closed by a plate 60. The chamber 48 is formed by a bore 49 disposed in the vertical plane of the chamber 44, whereas the chamber 46 is formed by a bore 47 lying in the horizontal plane of the chamber 44. The casing is shaped to constitute a closure for the inner ends of the chambers 46 and 48, the outer ends being closed by cap screw 58 and plate 60, respectively. Direct communication between each chamber and the inlet port 40 is provided by forming a bore 62 at right angles to and intersecting with the bores 45 and 49 and a counter-bore 64 to form inlet ports 40, 66 and 68, respectively.

The chamber 44 is in communication with the core of the radiator through the exhaust outlet 36. A piston valve 70 having heads 72 and 74 is slidably mounted in the bore 45 and controls the flow of oil into the restricted passage 26 through the outlet 36. The piston valve design is such that the port to the restricted passage of the oil cooler is closed by the piston valve when the oil is cold. A spring 76 interposed between the closure cap 56 and the hollow head 72 tends to hold the piston valve in the position, as shown in Fig. 4.

The plate 60 is provided with an outlet conduit 78 that establishes communication between the inlet port 40 and a chamber 80 between a sliding hollow piston 82 and the end plate 60 through the chamber 48 and an oil screen 54. The plate 60 serves to support the screen filter 54 by means of a hollow threaded fitting 84 and also serves to support a needle-valve 86. A portion of the needle-valve is triangular in cross-section, to form a guide and provides a passageway through which the fluid flows when the valve is displaced from its seat. A spring 88 is interposed between a cap screw 90 and the outer end of the needle-valve tending to keep the needle-valve in the closed position. Thus communication between inlet port 40 and chamber 80 is established through passageway 48, filter screen 54, hollow plug 84, conduit 78, and metering pin 86, which although adapted to be closed under certain conditions of operation by engagement of the conical part thereof with its cooperating seat, is never closed more than momentarily as hereinafter more clearly set forth.

The sliding piston 82 is provided with a friction tube 92 that extends axially into the hollow of the sliding piston and is disposed eccentrically with respect to the needle-valve 86 as may be seen in Fig. 3. A compression spring 94 is interposed between the sliding piston and an orifice screw 96 and is retained concentrically with the bore by a flanged washer 95. The screw 96 serves as a stop or abutment for both the piston valve 70 and the spring 94. The needle-valve 86 is provided with an elongated point which is adapted to contract the right-hand end of the piston 82 as the latter moves to the right under the influence of the spring 94. The needle-valve is thus lifted off its seat and oil is permitted to flow from the conduit 78 into the chamber 80.

The screw 96 extends across the bore 45 and is threaded into the wall thereof. This screw is formed with a hollow 98 at one end to permit the escape of oil from the space or chamber 99 between the hollow head 74 of the piston valve and the sliding piston 82 to the chamber 46 through an orifice 100 formed in the screw (see Fig. 6).

The friction tube 92 has a large diameter or flow area as compared with the orifice 100 and therefore the kinetic energy loss, which varies as the square of the velocity, is comparatively low. The friction tube, however, has a large amount of surface in contact with the oil, and therefore in comparison with the orifice, the surface friction or viscosity friction is quite high. Thus with the friction tube and the orifice in series so that the same quantity of oil at the same viscosity will flow through each, an increase in quantity will increase the pressure drop through the orifice more than through the friction tube, and an increase in viscosity will increase the pressure drop through the friction tube more than the pressure drop through the orifice. Therefore, since the friction tube offers a substantial resistance to flow, a decrease in viscosity will require an increased oil flow to maintain substantially the same pressure drop across the friction tube. This increase in flow through the orifice will increase the pressure drop more than the decrease in viscosity will lower it, for the reasons explained above. This increased orifice pressure drop, resulting from a decrease in viscosity, and the associated increase in flow, will increase the pressure in chamber 99 to supply the actuating pressure to move the piston 70 and furnish the desired control of oil flow through the valve.

The flow of oil for operating the viscosity responsive means, which, as illustrated, is the friction tube 92 and the orifice 100, is controlled by the valve-needle 86. Since this valve is held open by the spring-loaded piston 82, the needle-valve will be held wide open until the pressure differential between the sides of the piston due to the pressure drop of the flow through the friction tube is great enough to move the piston against the spring 94 and permit the spring 88 to move the valve-needle toward a closed or seated position. The piston thus tends to regulate the pressure drop across it and across the friction tube (to a constant value) by regulating the flow through the needle-valve, and whenever the drop across the friction tube is less than a value determined by the piston spring 94, the needle-valve will be held open.

The space or chamber 102 between the cap screw 56 and the hollow head 72 is vented by providing a conduit 104 that connects the same with the chamber 46 and consequently with the low pressure side of the regulator valve. By venting chamber 102 into chamber 46 by means of said conduit 104, the pressure in chamber 102 is always the same as that in chamber 46. Therefore, the operation of the piston 70 is controlled by the difference in pressures between chambers 102 and 99, which is the same as the pressure difference between chamber 99 and chamber 46, which is substantially the pressure drop across the orifice 100.

It will be seen that there are three flow paths through the valve emanating from the common inlet 40. One main path is through the passage 36 to the restricted passage 26, or cooling elements, of the cooler which is available when the piston 70 is in position to open the port 36. The other main path is through the passage 68, the valve 52 into the chamber 46, and through the outlet 38 to the unrestricted passage 28. These two main paths meet at the cooler outlet 30. The third path through the valve always has some flow through it but the quantity is quite small, in some cases approximately two per cent of the total flow. This path is through the port 66, chamber 48, screen 54, hollow fitting 84, passage 78, past the needle valve 86 into the chamber 80, through the friction tube 92 into the chamber 99, through the orifice 100 and passage 98 of the orifice screw 96 and into the chamber 46 where it joins with the second path.

In accordance with my invention, it is possible to utilize two oil coolers connected in series, each having its own viscosity regulating valve that is either identical in all respects or adjusted to a different viscosity range. This means that the first valve will operate on the same pressure difference as if there were a single cooler in the circuit, but it will have an average pressure which will be raised above the atmospheric pressure by whatever restriction is present in the second cooler. In order to make it possible to have this type of installation where one valve is connected in series with another and the general pressure of all parts of the first valve is raised and still have the several operating pressure differences thereof the same, it is necessary that the inlet to the valve and the outlet of the cooler circuit be points of common venting for the several paths of each valve-cooler combination.

The operation of the viscosity regulated device is as follows: Referring to Figs. 1, 2 and 9, the oil scavenged from the crankcase of the engine is delivered to the viscosity regulating device through the inlet port 40 and into conduit or chamber 44 and flows either through a first passage past the spring-loaded relief valve 52 and through the outlet 38 to the unrestricted passage 28 of the oil cooler or when the piston 70 moves from the cold position and uncovers the port for outlet 36, the oil is forced through a second passage through the outlet 36 by the pressure of the circuit which is limited by the spring-loaded valve 52. Thus, the oil passes through the cooling elements or through the jacket depending upon the position of the piston 70. The position of the piston 70 is determined by the pressure in the chamber 99. This pressure is controlled by the oil flow of a third passage from the high pressure of the chamber 44 which includes passages 48, the screen 54, the needle valve 86, friction tube 92, chamber 99, orifice 100, passage 98 and into chamber 46. The oil flow through the friction tube and the orifice are affected differently by a change in the viscosity of the oil and therefore the pressure in the chamber 99 is dependent upon the viscosity. It is this characteristic that causes the operation of the valve. Since the pressure in the chamber 99, sufficient to operate the piston valve 70, is dependent upon establishing a pressure drop between the chamber 44 and the unrestricted passage 28, and since the pressure drop in the restricted passage 26 will vary with temperature and flow of the oil, it will be obvious that a change in the pressure drop in the restricted passage will produce a tendency to change the pressure difference between the chamber 44 and the unrestricted passage 28. This change in pressure difference would change the pressure in chamber 99 and consequently vary the position of the valve 70 to increase or decrease the restricted opening provided by the piston 70 and the port for outlet 36. Thus the restriction to flow of oil into the restricted passage 26 is regulated by the viscosity of the oil and by the pressure drop in the restricted passage which pressure drop will vary with the viscosity and the flow of the oil therethrough.

I claim:

1. In a fluid system having means for providing fluid flow, three fluid paths, a conduit with which said paths communicate, a heat-exchange device in one path, a by-pass relief valve in a second path, a chamber in the third path, a device operatively connected to said chamber for establishing a pressure therein as a function of the viscosity of said fluid, and valve means responsive to said pressure for regulating the effective opening of said first-mentioned path to maintain at all times sufficient operating fluid pressure in said conduit to control said valve means in accordance with the viscosity of said fluid.

2. In a fluid system having means for providing fluid flow, three fluid paths, a conduit with which said paths communicate, a heat-exchange device in one path, a by-pass relief valve in a second path, an expansible chamber associated with the third path and having a port, a device communicatively connecting said port with said conduit for establishing a pressure in said chamber as a function of the viscosity of said fluid, and valve means responsive to said pressure for regulating the effective opening of said first-mentioned path to maintain at all times sufficient operating fluid pressure in said conduit to control said valve means in accordance with the viscosity of said fluid.

3. In a fluid system having means for providing fluid flow, three fluid paths, a conduit with which said paths communicate, a fluid viscosity regulator in one path, a by-pass relief valve in a second path, a chamber in the third path, a device connected to said chamber for establishing a pressure therein as a function of the viscosity of said fluid, and valve means responsive to said pressure differential for regulating the effective opening of said first-mentioned path to maintain at all times sufficient operating fluid pressure in said conduit to control said valve means in accordance with the viscosity of said fluid.

4. In combination with an oil cooler, a viscosity regulated valve comprising, an inlet port and a pair of outlet ports, one of said outlet ports being connected to the high pressure side of said cooler and the other connected to the low pressure side of said cooler, movable valve members associated respectively with each of said outlet ports for regulating the communication between said inlet and said outlet ports, one of said valve members serving to maintain its corresponding port closed until a predetermined pressure is reached, the second valve member loaded to operate at a pressure less than said predetermined pressure serving to regulate its port opening as a function of the viscosity of the fluid flowing therethrough in accordance with the varying pressure, and means for establishing said varying pressure as a function of the viscosity of the fluid flowing through said valve.

5. In a fluid system, three fluid paths, a conduit with which said paths communicate, a heat exchange device providing a restriction in one path, a relief valve in a second path, a chamber in the third path, said chamber being communicatively connected with a friction tube constituting an inlet and with an orifice constituting an outlet, means for providing communication from said conduit to said inlet to establish a pressure in said chamber as a function of the viscosity of said fluid and valve means responsive to said pressure for regulating the restriction in said first-mentioned path in a manner such as to maintain regardless of change in the viscosity of the fluid a sufficient operating fluid pressure in said conduit to control said valve means.

6. In a fluid system, three fluid paths, a conduit with which said paths communicate, a heat exchange device varying in restriction to fluid flow in accordance with changes in the character of the fluid flowing therethrough and being communicatively connected with one of said paths, a valve associated with said heat exchange device for regulating the flow of fluid therethrough, a valve in a second path operating against a substantially constant pressure loading, means in a third path for establishing a viscosity responsive pressure and an expansible chamber responsive to said viscosity pressure to actuate said first mentioned valve in a manner such as to provide a restriction in said first mentioned path sufficient to produce an operating pressure for said chamber in said conduit.

7. In a fluid system in which the fluid flow is progressive from a high pressure to a low pressure through three paths, means in one of said paths for producing a viscosity responsive pressure and valve means in each of the other said paths, one of said valve means being controlled by said viscosity responsive pressure for regulating the flow of fluid therethrough, the other of said valve means serving to control the flow of fluid therethrough in accordance with a predetermined pressure.

8. In a fluid flow system having an inlet and an outlet and two branches communicating therewith (a cooling circuit and a bypass circuit), spring loaded valves for controlling fluid flow through said branches, an expansible pressure chamber for actuating one of said valves and means for establishing communication between said inlet and said outlet and said chamber and operative to vary the pressure in the said chamber according to the viscosity of the fluid.

9. In a regulator for controlling the flow of fluid through a heat exchange device, a casing provided with an inlet and two outlets, a spring loaded valve for controlling the flow of fluid through one outlet, a second valve for controlling the fluid flow through the other outlet, an expansible pressure chamber for actuating said second valve and means communicatively connecting said expansible chamber with said inlet and one of said outlets and operative to vary the pressure in said expansible chamber in accordance with the viscous effects of said fluid flow in such a manner as to vary the restriction of the flow of fluid through said second outlet.

10. In a fluid system having a plurality of branches and an inlet and outlet common to each of said branches, a valve closing one of said branches with a predetermined loading to thereby determine the maximum pressure drop between said common inlet and outlet of said branches, a second branch utilizing the pressure drop existing therein to produce a pressure responsive to viscosity, and a third branch having a valve responsive to said viscosity pressure for regulating the total restriction of said third branch to regulate fluid flow through either or both of the first or third mentioned branches according to the viscosity of the fluid.

11. In an oil circulating system, a cooler, means for by-passing oil around said cooler, means for limiting the pressure of the oil supplied to said cooler, viscosity responsive means including a chamber wherein the pressure of oil flowing therethrough is a function of its viscosity, means to divert a portion of the oil from said system through said viscosity responsive means, and valve means responsive to the oil pressure in said chamber for controlling flow through said cooler and by-pass.

12. In combination, an engine, an oil tank, a system connecting said pump to said tank, a cooler in said system, means for by-passing oil around said cooler, means for limiting the pressure of the oil supplied to said cooler, viscosity responsive means including a chamber wherein the pressure of oil flowing therethrough is a function of its viscosity, means to divert a portion of the oil from said system through said viscosity responsive means, and valve means responsive to the oil pressure in said chamber for controlling flow through said cooler and by-pass.

13. In an oil circulating system, an oil reservoir, a device to be lubricated, a three branch oil path between said reservoir and device, a cooler in one branch, viscosity responsive means in another branch including a chamber wherein the pressure of oil flowing therethrough is a function of its viscosity, valve means responsive to the oil pressure in said chamber for controlling flow through said cooler and the remaining branch, and a relief valve for limiting the pressure of the oil supplied to the cooler.

14. In combination, an engine, an oil tank, a pump for withdrawing oil from the engine sump, a three branch oil path connecting said pump to said tank, a cooler in one branch, viscosity responsive means in another branch including a chamber wherein the pressure of oil flowing therethrough is a function of its viscosity, valve means responsive to the oil pressure in said chamber for controlling flow through said cooler and the remaining branch, and a relief valve for limiting the pressure of the oil supplied to the cooler.

15. In an oil circulating system, a cooler, means for by-passing oil around said cooler, viscosity responsive means communicating with said system exterior of the ends of said by-passing means and including a chamber wherein the pressure of the oil flowing therethrough is a function of its viscosity, valve means responsive to the pressure in said chamber for controlling flow through said cooler, and valve means for regulating the pressure of oil flowing into said cooler.

16. In an oil circulating system, an oil path containing a pump and a heat exchanger, means for by-passing oil around said exchanger, means for regulating the pressure of oil flowing into the heat exchanger, viscosity responsive means communicating with said system between said pump and said pressure regulating means and including a chamber wherein the pressure of the oil flowing therethrough is a function of its viscosity, and valve means responsive to the pressure in said chamber for controlling flow through said heat exchanger.

17. In an oil circulating system, an oil path containing a pump and a heat exchanger, a by-pass around said heat exchanger, valve means for controlling flow through said by-pass and heat exchanger, viscosity responsive means connected with the system between said pump and valve means and including a chamber wherein the pressure of oil flowing therethrough is a function of its viscosity, said valve means being responsive to the pressure in said chamber, and means for regulating the pressure of oil flowing into said heat exchanger.

18. In an oil circulating system, a cooler, means for by-passing oil around said cooler, means for limiting the pressure of the oil supplied to said cooler, a branch path for diverting a portion of the oil in said system around said pressure limiting means, and means for controlling flow through said cooler in response to variation in the viscosity of the oil flowing through said branch path to increase the flow through said cooler upon decrease in the viscosity of the oil in said branch path and to decrease the flow through said cooler upon increase in the viscosity of the oil in said branch path.

19. In combination, an engine, an oil tank, a system connecting said pump to said tank, a cooler in said system, means for by-passing oil around said cooler, means for limiting the pressure of the oil supplied to said cooler, a branch path for diverting a portion of the oil in said system around said pressure limiting means, and means for controlling flow through said cooler in response to variation in the viscosity of the oil flowing through said branch path to increase the flow through said cooler upon decrease in the viscosity of the oil in said branch path and to decrease the flow through said cooler upon increase in the viscosity of the oil in said branch path.

WELDON WORTH.